(12) United States Patent
Li

(10) Patent No.: US 12,125,143 B2
(45) Date of Patent: Oct. 22, 2024

(54) SYSTEMS AND METHODS FOR NEURAL-NETWORK BASED VIDEO ENCODING

(71) Applicant: ROVI GUIDES, INC., San Jose, CA (US)

(72) Inventor: Zhu Li, Overland Park, KS (US)

(73) Assignee: ROVI GUIDES, INC., San Jose, CA (US)

( * ) Notice: Subject to any disclaimer, the term of this patent is extended or adjusted under 35 U.S.C. 154(b) by 203 days.

(21) Appl. No.: 17/829,734

(22) Filed: Jun. 1, 2022

(65) Prior Publication Data

US 2023/0394762 A1 Dec. 7, 2023

(51) Int. Cl.
*G06T 17/10* (2006.01)
*G06N 3/045* (2023.01)

(52) U.S. Cl.
CPC ............. *G06T 17/10* (2013.01); *G06N 3/045* (2023.01)

(58) Field of Classification Search
CPC .......... G06T 17/10; G06T 9/00; G06N 3/045; G06N 3/0499; G06N 3/084; G06N 3/09
USPC .......................................... 345/418; 382/274
See application file for complete search history.

(56) References Cited

U.S. PATENT DOCUMENTS

| | | | | |
|---|---|---|---|---|
| 2018/0121791 A1* | 5/2018 | O'Connor | ............... | G06N 3/049 |
| 2019/0180499 A1* | 6/2019 | Caulfield | ............... | G06V 20/17 |
| 2020/0160546 A1* | 5/2020 | Gu | ............... | G06T 3/18 |
| 2020/0293864 A1* | 9/2020 | Nagel | ............... | G06N 3/084 |
| 2021/0350168 A1* | 11/2021 | Tian | ............... | G06V 10/82 |
| 2023/0281955 A1* | 9/2023 | Ackerson | ............... | G06T 15/506 382/274 |

OTHER PUBLICATIONS

Isik (Berivan Isik: "Neural 3D Scene Compression via Model Compression", arxiv.org, Cornell University Library, 201 Olin Library Cornell University Ithaca, NY 14853, May 7, 2021, (May 7, 2021), XP081959278,).*

(Continued)

*Primary Examiner* — Prabodh M Dharia
(74) *Attorney, Agent, or Firm* — HALEY GUILIANO LLP

(57) ABSTRACT

System and method are provided for encoding a frame of 3D media content. The systems accessing voxel geometry information for a first frame and trains a neural network based on the voxel geometry information, such that the neural network is configured to receive a coordinate of a voxel and output color attributes information for the voxel. The trained neural network comprises a plurality of weights for each layer of the neural network. The system converts weights of each respective layer of the first neural network into a respective first intermediary matrix. And then each respective first intermediary matrix is decomposed to create a respective first decomposition data that compromises a plurality of components that approximate the respective first intermediary matrix when combined. The system then generates encoding data for the first frame by storing each respective decomposition data for each respective first intermediary matrix.

17 Claims, 9 Drawing Sheets

(56) References Cited

OTHER PUBLICATIONS

Tojo et al. (Recolorable Posterization of Volumetric Radiance Fields Using Visibility-Weighted Palette Extraction, Computer Graphics Forum : Journal of the European Association for Computer Graphics, vol. 41, No. 4, Jul. 1, 2022 (Jul. 1, 2022), pp. 149-160, XP093095633, Oxford ISSN: 0167-7055, DOI: 10.1111/cgf.1.*

Kathariya et al., "Gradient Compression with a Variational Coding Scheme for Federated Learning," 2021 International Conference on Visual Communications and Image Processing (VCIP) (2021) (5 pages).

Li et al., "Advanced 3D Motion Prediction for Video-Based Dynamic Point Cloud Compression," IEEE Transactions on Image Processing, 29:289-302, (2020).

Li et al., "Guest Editorial Introduction to the Special Issue on Recent Advances in Point Cloud Processing and Compression," IEEE Transactions on Circuits and Systems for Video Technology, 31(12):4555-4560 (2021).

Mildenhall et al., "NeRF: representing scenes as neural radiance fields for view synthesis," Communications of the ACM, vol. 65 (1):99-106 (2022).

Pumarola et al., "D-NeRF: Neural Radiance Fields for Dynamic," Proceedings of the IEEE/CVF Conference on Computer Vision and Pattern Recognition (CVPR), pp. 10318-10327 (2021).

Wang et al., "Multiscale Point Cloud Geometry Compression," IEEE Data Compression Conference(DCC), Snowbird, USA (2021) (10 pages).

Xian et al., "Space-Time Neural Irradiance Fields for Free-Viewpoint Video," Proceedings of the IEEE/CVF Conference on Computer Vision and Pattern Recognition (CVPR), pp. 9421-9431 (2021).

\* cited by examiner

SYSTEMS AND METHODS FOR NEURAL-NETWORK BASED VIDEO ENCODING

BACKGROUND

This disclosure is directed to systems and methods for encoding video frames, where the color information for voxels is encoded via a series of neural networks. In some embodiments, systems and methods for encoding video frames are provided that allow for intra-coding and inter-coding of color encoding neural networks to reduce required storage space.

SUMMARY

Advancements in computerized video processing technology have enabled expanded use of complex video that takes advantage of captured 3D data. For example, memory dense 3D video data can be obtained using live motion capture (e.g., when an actor wears markers or sensors on a bodysuit). In another example, 3D virtual environments may require memory dense storage of 3D video data for use in Augmented Reality (AR) or Virtual Reality (VR) applications. For example, a 3D model 10-bit geometry in three dimensions (e.g., [x, y, z] directions) and 8-bit Red-Green-Blue ("RGB") color attributes may require storage of 700K to 1M voxels to define geometry and color of each voxel of the model for each frame of video media content. Accordingly, storage of such massive information without compressing is taxing on storage systems and is very computationally intensive. Moreover, an attempt to transmit such data via a network is extremely bandwidth demanding and may cause network delays and unacceptable latency, To help address these problems, systems and methods are provided herein that efficiently code geometry information for voxels of a frame in 3D media content (e.g., to enable recovery of a frame by mapping XYZ voxel location to an RGB color value for that voxel). In some embodiments, the geometry is coded using a series of machine learning models (e.g., fully connected neural networks) defined by their weights. The weights information can be further compressed for each frame and between frames using techniques describe herein to achieve intra-coding and inter-coding storage savings.

In some embodiments, a computer system (e.g., using a codec application) may access voxel geometry information for a first frame (e.g., any selected frame) of a 3D media content. For example, the voxel geometry information may define all voxels in the frame by their 3D location (e.g., 3 coordinate values) and list matching color data (e.g., RGB values). The computer system may perform encoding of the first frame as a fully-encoded intra-coded frame.

In some embodiments, the computer system may train a first neural network (e.g., a fully connected neural network) based on the voxel geometry information, such that the neural network is configured to receive a coordinate of a voxel as input and output color attributes information for the voxel. The first neural network may be trained by adjusting weights until the first neural network begins predicting output color attributes information for each voxel with sufficient degree of correctness.

The computer system may then further process the weights of the neural network to achieve intra-frame encoding. In one example, the weights of the first neural network may be represented as a table with each column representing weights for each layer of the first neural network. Each such column may be converted into an intermediary matrix (e.g., a 256×1 column of weights maybe be changed into a 16×16 matrix or a 32×8 matrix, etc.).

The computer system may then decompose each intermediary matrix into a plurality of components that approximate the respective first intermediary matrix when combined. For example, the computer system may perform Singular Value Decomposition (SVD) of the intermediary matrix to acquire a set of bases comprising 2 vectors, where the size of the vectors matches the number of rows and columns of the intermediary matrix. Each basis may be associated with a corresponding Singular Value (SV). To achieve memory saving, the computer system may only determine or only store a certain number of most significant decomposition components. For example, for a 16×16 matrix, the system may store between 3-8 most significant components (e.g., components with largest SVs). The number of most significant components may be selected in proportion to the size of the intermediary matrix.

The computer system may store the significant components as encoding for the frame. Because only a certain number of components is stored, storage saving is achieved. To recover the frame (e.g., to display the 3D media content) the system may reconstruct each intermediary matrix based on the stored components and convert each reconstructed matrix into weights for the neural network. The computer system may then reconstruct a neural network with the recovered weights. The reconstructed neural network may be used to construct the frame by using it to recover color information for each known voxel of the frame.

The computer system may also achieve inter-frame memory savings by encoding a second frame of the 3D media content using the encoding data of the first frame. For example, the computer system may train a second neural network based on voxel geometry information of the second frame, such that the second neural network is configured to receive a coordinate of a voxel of the second frame and output color attributes information for the second frame. The training of the second neural network may simplified by starting the training with weights computed for the first frame.

The computer system may convert the second weights of each respective layer of the second neural network into a second respective intermediary matrix using the same process that was used to created intermediary matrices for the first frame. Then, for each second intermediary matrix, the system may identify a matching intermediary matrix of the first frame (e.g., first column of weights of the neural network for the first frame may be matches to first column of weights of the second neural network for the second frame). The computer system may then compute decomposition components for the second intermediary matrix by re-using the set of bases already computed for the matching intermediary matrix of the first frame. That is, the basis will remain the same, while only the SVs will change.

The computer system may then encode the second frame as differences between the SVs of intermediary matrices for the second frame and matching SVs of intermediary matrices for the first frame (for each intermediary matrix). Storing only the difference dramatically reduces the memory requirements for encoding each predictive inter-coded frame re-using information from the first frame.

To recover the second frame (e.g., to display the 3D media content) the system may reconstruct each intermediary matrix based on the stored differences for the second frame (and stored basis for the first frame) and convert each reconstructed matrix into weights for the neural network.

The computer system may then reconstruct a second reconstructed neural network with the recovered weights. The second reconstructed neural network may be used to construct the second frame by using it to recover color information for each known voxel of the second frame.

This process may be repeated for each frame following the first frame to encode any number of predictive frames, until the frames of the 3D media content changes significantly. At that point, a new fully coded frame may be created, and the following frames may be coded as predictive frames based on the new fully coded frame.

As a result of the use of these techniques, 3D media content may be efficiently encoded for storage and/or for transmission.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1A:
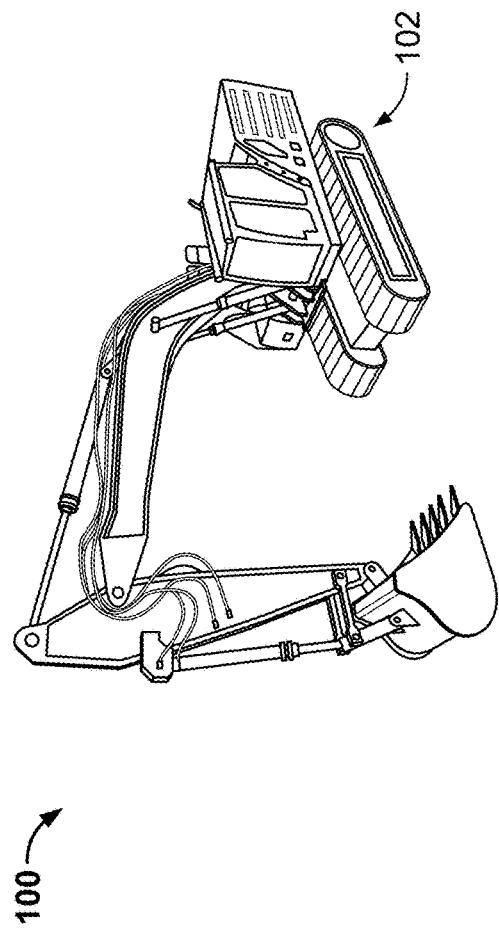
FIG. 1A shows a view of an example of 3D media content, in accordance with some embodiments of this disclosure.

FIG. 1A shows a view 100 of a frame of an exemplary of 3D media content 102. In one approach, 3D frame 102 is encoded by storing each voxel data individually, for example as a table of horizontal, vertical and depth coordinates (x, y, z, coordinates) associated with color data (e.g., 3-value Red, Green, Blue color data). At render time, an encoder/decoder (codec) application (e.g., executing on a computing system) may perform live rendering based on voxel data (e.g., using ray tracing) to render the voxel data from a certain angle. Such voxel data may be used instead vector-based graphics, e.g., when 3D data is generated using live motion capture. In one approach the voxel data may be encoded using a High Efficiency Video Coding (HEVC) codec scheme. One type of exemplary technique for HEVC encoding is described by L. Li, et al., "Advanced 3D Motion Prediction for Video-Based Dynamic Point Cloud Compression," in IEEE Transactions on Image Processing, vol. 29, pp. 289-302, 2020, which is herein incorporated by reference in its entirety.

Figure 1B:
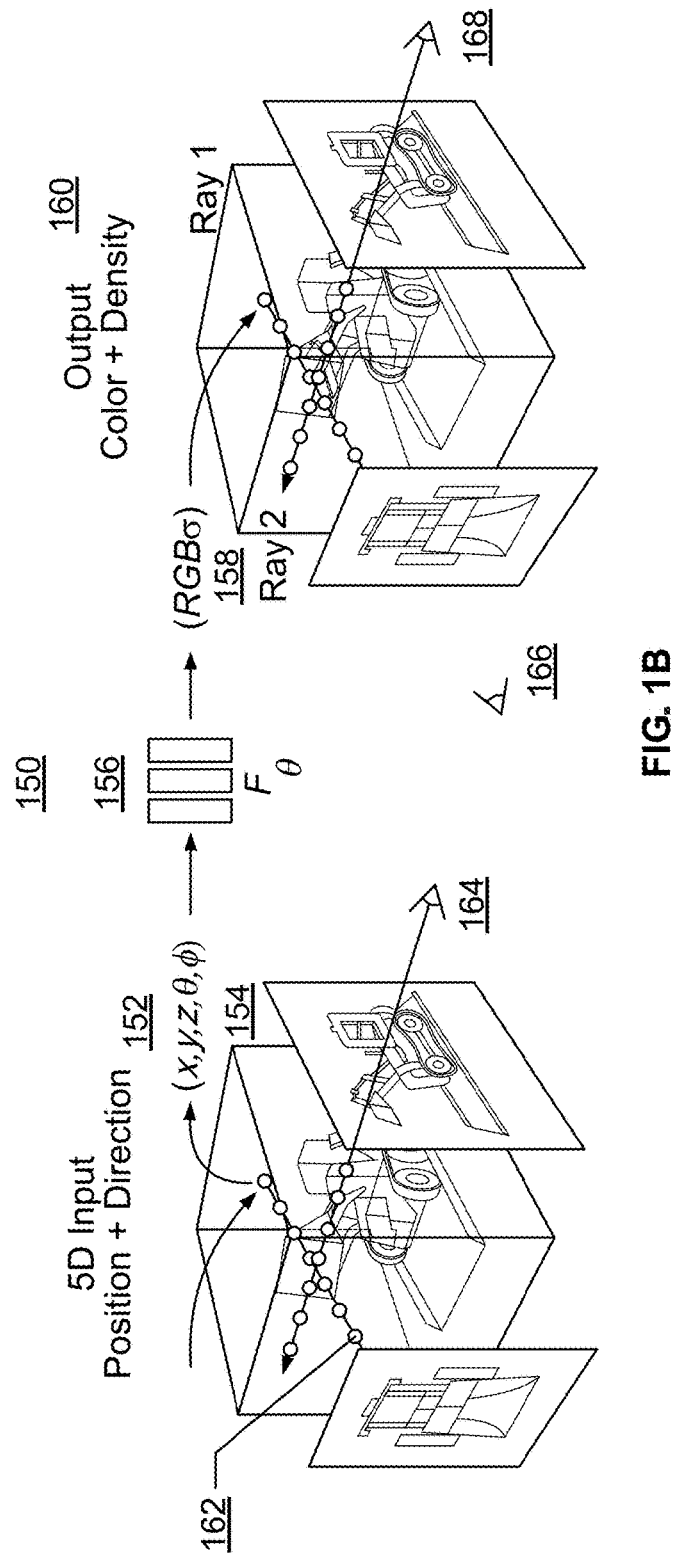
FIG. 1B shows a view of an example of encoding 3D media content data using a neural network, in accordance with some embodiments of this disclosure.

FIG. 1B shows a view of an example 150 of encoding 3D media content data (e.g., data of frame 102) using a neural network, in accordance with some embodiments of this disclosure. In this approach, neural network $F_\Theta$ may be trained by the codec application to efficiently encode color data of 3D data used to generated frame 102. For example, the neural network may be trained to receive 152 as input pixel coordinates [x, y, z] and view angle [theta, phi] 154. The input coordinates may correspond to voxels along one of the rays 164 or 162. Neural network $F_\Theta$ may output color information 158. Color information may comprise Red, Green, and Blue values (RGB) of a voxel as well as density of the color as viewed on one of the rays 166 or 168 (which may correspond to rays 164 or 162). By iterating through multiple rays, and entire 2D frame may be constructed by the coded application based on 3D voxel data. For example, view 150 shows two 2D images of 3D model shown in FIG. 1A.

Figure 2:
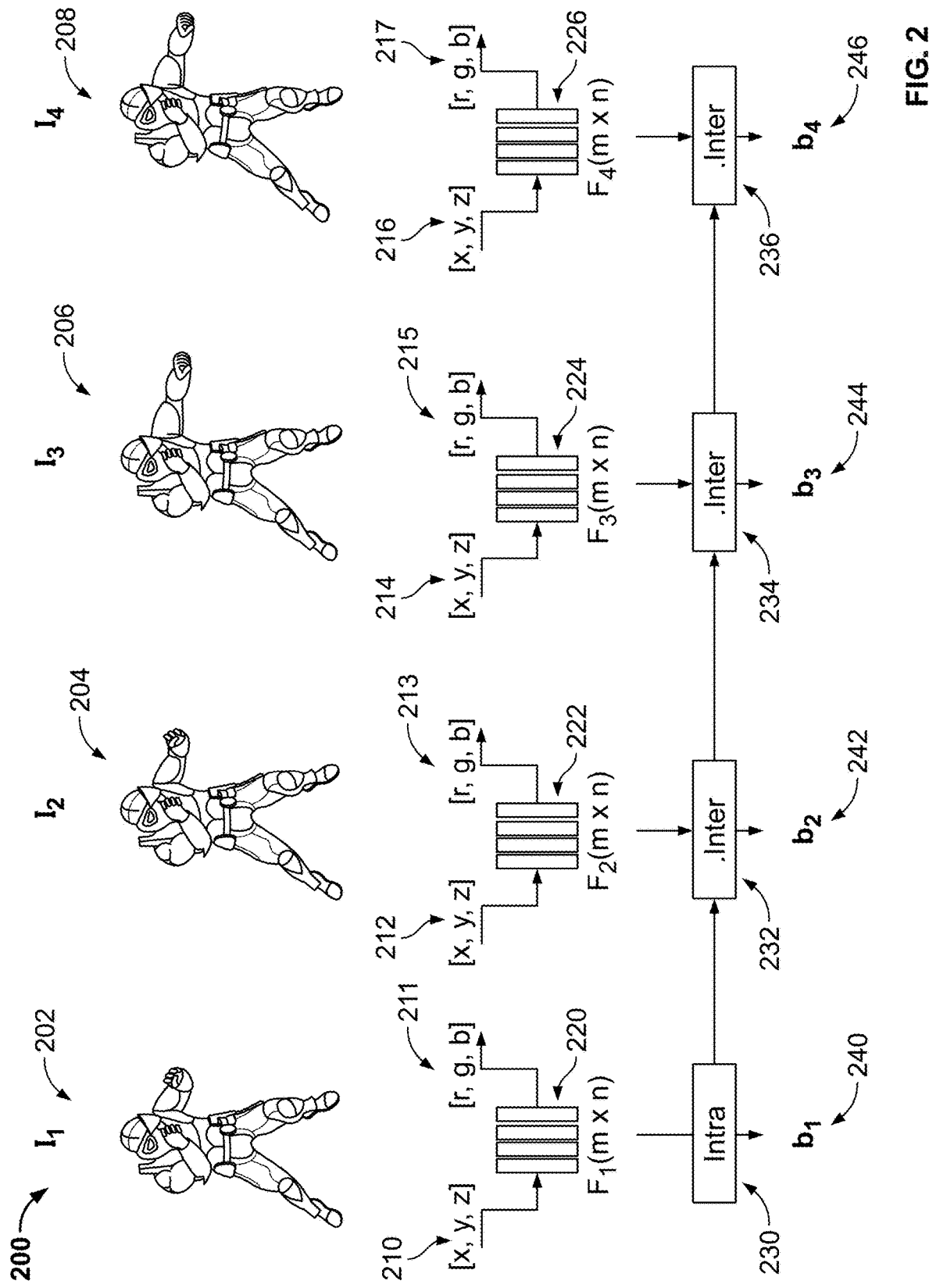
FIG. 2 shows another illustrative example of encoding 3D media content data using a neural network, in accordance with some embodiments of this disclosure.

FIG. 2 shows another illustrative example 200 of encoding 3D media content data using a series of neural networks, in accordance with some embodiments of this disclosure. In some embodiments, a series of neural networks may be created to efficiently predict color attribute for known voxel geometry (e.g., point cloud frames stored, for example, as list of voxels listing their coordinates). In some embodiments, the encoding scheme uses both intra-coding for some key fully-coded frames, and inter-coding for frames that are similar to fully-coded frame to achieve efficient data compression.

FIG. 2 shows a set of consecutive frames $I_1$ 202, $I_2$ 204, $I_3$ 206, and $I_4$ 208, each based on a 3D model (e.g., of a human figure) as the model changes over time. Each frame 202, 204, 206, and 208 may be defined by voxel point cloud data (e.g., a set of [x,y,z] coordinates or a set of polar coordinates). Initially, color information (e.g., [r,g,b] data and/or [hue, saturation, brightness] data) may also be stored for each voxel (e.g., in a table or other suitable data structure). The codec application may reduce memory required to store the color data by generating a set of neural networks $F_1$ 220, $F_2$ 222, $F_3$ 224, $F_4$, and 226, wherein each neural network is trained to generate color attributes values information (e.g., [r,g,b] data and/or [hue, saturation, brightness] data) based on coordinate input (e.g., [x,y,z] input).

For example, coordinate values [x, y, z] 210 may be input into neural networks $F_1$ 220 to acquire color attributes values [r, g, b] 211. Neural networks 222, 224, and 226 may be similar trained to process coordinates data 212, 214, 216 into color data 213, 215 and 217, respectively. Network 220 may be trained by an iterative process of adjusting weights for each layer of the neural network 220. For example, the codec application may input a training set of coordinates into neural network $F_1$ 220 and compare the output to real color value (e.g., as defined by full voxel table that stored voxel location and color information). The weights may then be adjusted based on how closely the output matches the real color value. The training process may be repeated until results stop improving or until a certain performance level is achieved (e.g. until 95% accuracy is achieved). Neural networks $F_2$ 222, $F_3$ 224, $F_4$, and 226 may be trained in a similar way. In some embodiments, training of neural networks $F_2$ 222, $F_3$ 224, $F_4$, and 226 may be expedited by beginning the training with weights already computed for neural network $F_1$ 220.

The codec application may achieve further storage space saving by intra-coding and inter-coding the computed weights of the neural networks $F_1$ 220, $F_2$ 222, $F_3$ 224, $F_4$, and 226 (e.g., because the weights can be expected to be similar.) Neural networks 220-226 may be based on fully connected layers, e.g., as further described by Chellapilla, "High Performance Convolutional Neural Networks for Document Processing," Tenth International Workshop on Frontiers in Handwriting Recognition, Université de Rennes, Oct. 1, 2006, which is hereby incorporated by reference herein in its entirety.

For example, frame 202 may be the first frame where a certain human-figure appears, and may be thus chosen to be a fully coded frame that only benefits from intra-coding. Intra-coding of the weights of neural network $F_1$ 220 may be achieved by the codec application accessing the weights of each layer of the network $F_1$ 220. For example, each layer of neural network $F_1$ 220 may be represented by a column of a table (e.g., a table with 256 values in each column).

In some embodiments, the codec application may decompose each column into individual components. In one approach the column may be converted into an intermediary matrix prior to decomposition. For example, each column of size 256 may be converted into a 16×16 matrix W or any other suitable matrix W with more than one row and more than one column (e.g., 32×8 matrix).

The codec application may then perform decomposition of matrix W. For example, the codec application may use single value decomposition (SVT), principle component analysis (PCA), eigen decomposition or any other suitable decomposition technique that produces a number of components that could be combined to approximate the matrix W. SVD decomposition may be performed, e.g., as described by Menon, et. al "Fast Algorithms for Approximating the Singular Value Decomposition," ACM Transactions on Knowledge Discovery from Data Volume 5, Issue 2, February 2011, Article No.: 13 pp 1-36, which is herein incorporated by reference in its entirety.

For example, the codec application may compute a series of vector pairs $U_1V_1$-$U_kV_k$, where vector U has a size equal to a number of rows of matrix W, and vector V has a size equal to a number of columns of matrix W. Each vector pair UV may be considered the "basis" of the matrix W. For each pair of bases UV, the codec application may also compute a corresponding singular value (SV) σ, e.g., to compute a series of $\sigma_1$-$\sigma_k$. Notably, only the first k bases UV may be computed (e.g., for a largest k SVs σ) and/or stored. The magnitude of k may be selected based on the size of matrix W, based on pre-selected criteria, or based on any other suitable technique (e.g., by empirical analyses to capture more than 90% of matrix content represented by all bases).

The codec application may then store the computed k bases and SVs (for matrices W computer for each layer of neural network 220) as data 230 as encoding that represents intra-coded frame 202. Because only k bases are stored, high degree of compression is achieved. Similar saving may be achieved by using only a first few terms of eigen decomposition or terms of PCM decomposition.

To perform decoding (e.g., during display of frame 202 when the 3D content is playing), the codec application may recover an approximation of each matrix W stored as part of encoding representing intra-coded frame 202. If SVD encoding was used, matrix W' (an approximation of matrix W) may be recovered using formula 1:

$$W' = \Sigma_{i=1}^{k} \sigma_i U_i V_i^T \quad (1)$$

Where $V^T$ is a transverse of vector V. In this way all stored basis UV are added back together (after being scaled by respective SV σ) to achieve an approximation W' of matrix W. Each recovered matrix W' may then be converted back into a list of weights (e.g., a column) for use in neural network 220. The neural network 220 may then be used in combination with known geometry data to recover color information b1 240 for each voxel of frame 202.

Frames 204, 206, and 208 may be determined to be similarly to frame 202, and for this reason the codec application may perform predictive coding for theses frames to achieve additional inter-frame compression. For example, to encode neural network 222, the codec application may first train the neural network 222 in a similar fashion in which network 220 was trained, but with a training dataset selected from voxels of frame 204 and by starting the training with weights of network 220.

The weights of neural network 222 may be represented as a table with each column representing weights of one of the layers of the neural network 222. Each such column may have a matching column in a table computed based on weights of neural network 220 (e.g. a first column of weights of network 220 may match a first column of weights of network 222).

Each column of weights of neural network 222 may be converted into a matrix W2 similarly as to how a matching matrix W was created for weights of neural network 220. Once each matrix W2 is created, the codec application may decompose each matrix W2 using the same bases as were used to decompose the matching matrix W, e.g. using basis $U_1V_1$-$U_kV_k$. However, the SVs $\sigma2_1$-$\sigma2_k$ for matrix W will be different. For example, matrix W2 could then be approximated by matrix W2' computed with formula 2:

$$W2' = \Sigma_{i=1}^{k} \sigma2_i U_i V_i^T \quad (2)$$

To create an encoding for frame 204, the codec application may simply store as intra-coded data 232 the pairwise differences between values $\sigma_1$-$\sigma_k$ and $\sigma2_1$-$\sigma2_k$, e.g., by storing values $\sigma_1$-$\sigma2_1$ ... $\sigma_k$-$\sigma2_k$ (for each pair of matched matrices W and W2).

To perform decoding (e.g., during display of frame 204 when the 3D content is playing), the codec application may recover an approximation of matrix W2 stored as part of encoding representing inter-coded frame 204. For example, the codec application may access bases and SVs stored for each matrix W as part of data 230, and compute new SVs using differences stored as part of encoding data 232. Once new SVs are computed, the coded application may recover each matrix W2' as shown in the formula above. Each recovered matrix W2' may then be converted back into a list of weights (e.g., a column) to re-create an approximation of neural network 222. The neural network 222 may then be used in combination with known geometry data to recover color information b2 242 for each voxel of frame 204.

Similar intra-coding may be performed for networks 224 and 226 to create coding data 234 and 236 to enable recovery of color data 244 and 246 when the frames 202-208 are played in succession. In some embodiments, inter-coding for any of frames 206, 208 is not based on frame 204, and may instead be based on any other frame that occurs before or after frames 204, 206, or 208 in the 3D media content. For example, the coded application may select a frame for inter-coding by finding most similar frame that was already fully coded (intra-coded). In some embodiments, the codec application may decide to create new fully coded (intra-coded) frame at certain time intervals or when 3D media content is determined by the codec application to be sufficiently different from existing coded frames. In some embodiments, any of frames 204, 206, 208 may be coded bidirectionally. For example, the SV differences may be computed based on data from one frame that comes before frames 204, 206, or 208 and based on data from one frame that comes after frames in the 3D media content. In some embodiments, SVD bases for intra-coded frames may differ from each other. In this case, the coded application may store SVD bases differences as well as SV differences. In some embodiments, difference between network 222 and 224 may be coded using any other suitable technique to achieve inter-coding.

Figure 3A:
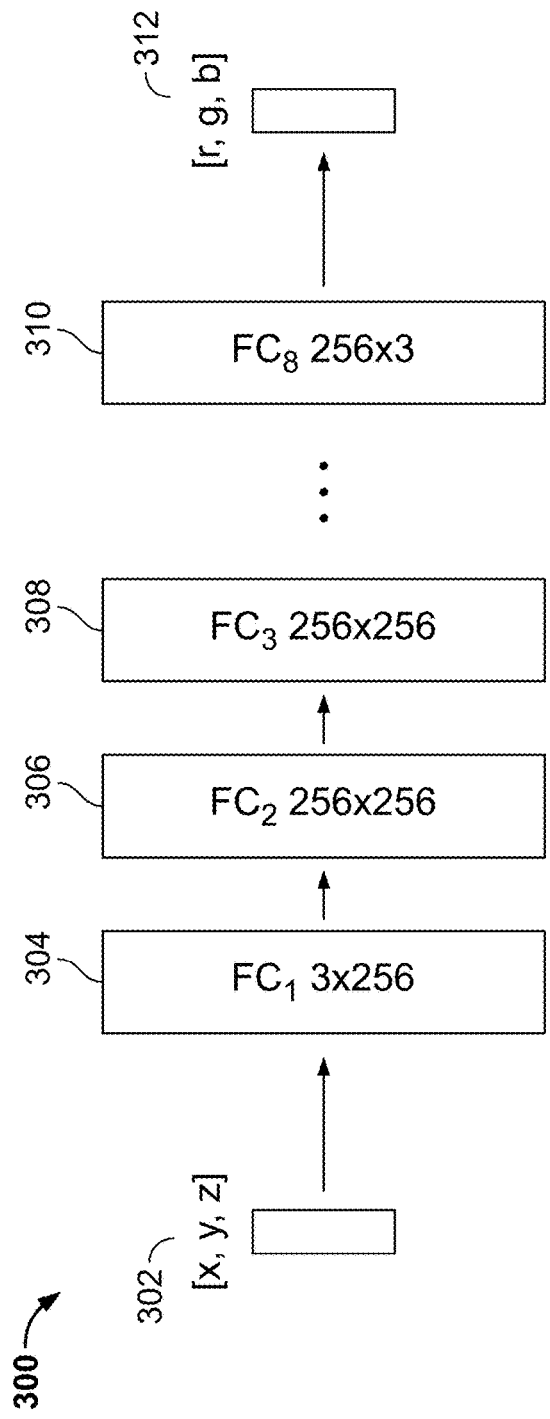
FIG. 3A shows another illustrative example of encoding 3D media content data using a neural network, in accordance with some embodiments of this disclosure.

FIG. 3A shows another illustrative example of encoding 3D media content data using a neural network, in accordance with some embodiments of this disclosure. For example, neural network 300 may be the same as either one of neural networks 220-226 of FIG. 1. As such, neural network 300 may be configured by the codec application to accept 3 inputs (e.g., the [X, Y, Z] coordinates of a vertex) and output 3 outputs (e.g., the [R, G, B] values that define color the voxel). Neural network 300 is depicted as having 8 layers 304-310, however any suitable number of layers may be used (e.g., 16, 32, etc.) The neural networks may be fully connected neural networks or convolution neural networks. One skilled in the art would understand that other suitable type of neural networks or other types of suitable machine learning models may also be used.

As shown, the first layer 304 of neural network 300 may have the size of 3×256 to accommodate the input of [X, Y, Z] coordinates, and similarly the last layer 310 may have the size of 256×3 to accommodate the output of [R, G, B] values. The other layers 306-308 may be 256×256 fully connected layers to maximize the processing capability. Each layer may be fully connected to the next layer. However, any other suitable size may also be used (e.g., 3×128, 128×128, and 128×3, etc.).

Each layer 304-310 may comprise weights for each neuron. In the shown embodiment the numbers of stored weights (if stored naively) would equal to 3*256+ 6*256*256+256*3=394752. To achieved storage size reduction, the weights may first be converted into columns and decomposed as described above and below.

Figure 3B:
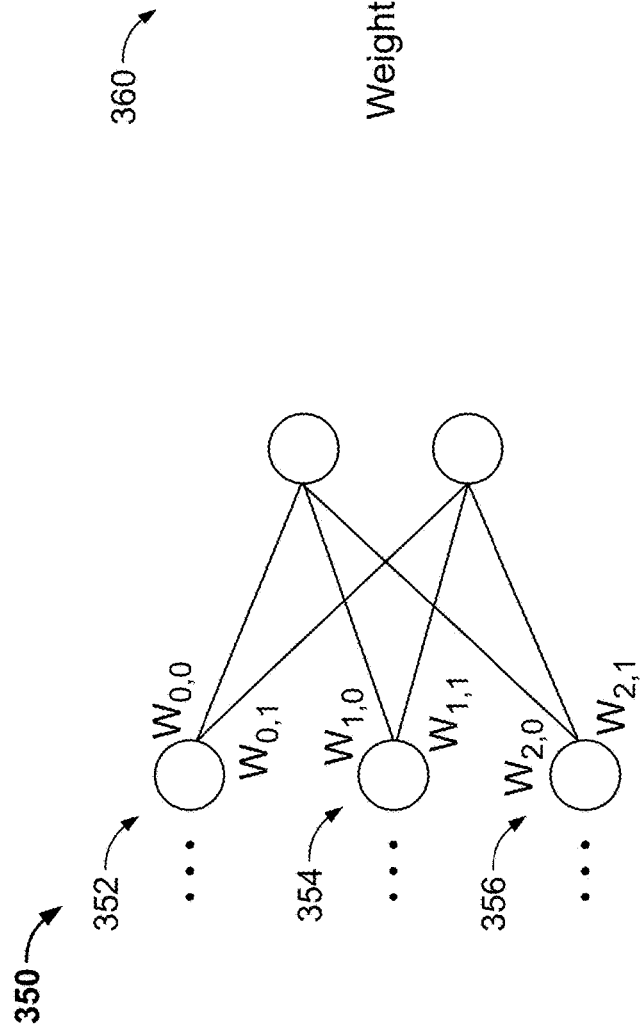
FIG. 3B shows illustrative example of weights of a neural network, in accordance with some embodiments of this disclosure.

FIG. 3B shows illustrative example of weights of a neural network, in accordance with some embodiments of this disclosure. For example, weights of each layer may include a set of neurons (e.g., 352-356), each with associated weights. Weights of each layer may be converted into a column of 6 values. However, any size column be used (e.g., 256 for network 300). Columns of weights 360 may then be converted by the codec application into matrix W as described above. Matrix W may be converted into set of components, e.g., SVD components, that would approximate the matrix W if combined. For example, only first 3-8 SVD components may be stored for column with the size of 256 values. As explained above, each component would include two vectors (bases) of size matching rows and column sized of matrix W and an SV number for each basis. Storing, by the codec application, bases and SVs for a reduced number of decomposition components allows for memory size reduction while preserving the ability to recover approximated matrix W' (e.g., as shown in a formula 1 above).

Figure 4:
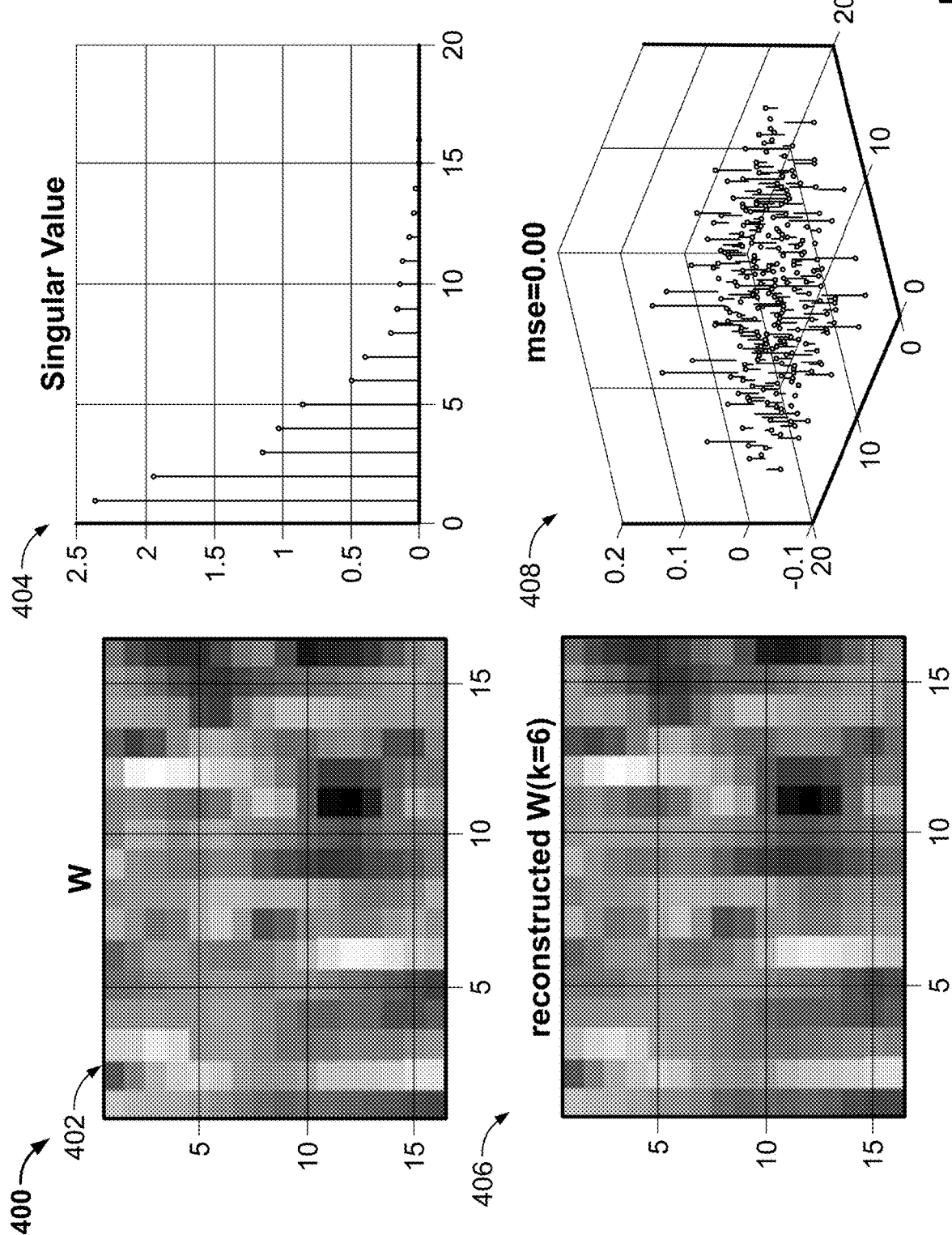
FIG. 4 shows an illustrative example of intermediary matrix and decomposition data for the intermediary matrix, in accordance with some embodiments of this disclosure.

FIG. 4 shows an illustrative example of intermediary matrix and decomposition data for the intermediary matrix, in accordance with some embodiments of this disclosure. In some embodiments 16×16 matrix W 402 may be a matrix based on one of the columns of neural network 300 with 256 values. As shown darker squares indicate higher value in the matrix W.

Graph 404 demonstrates first a 20 SVs for an SVD decomposition of matrix W 402. As shown most information of matrix W is concentrated in a first 6 SVD components. The codec application may use this to make a decision to only store first 6 components of matrix W. In some embodiments the codec application may decide how many components to save using user interface-selected criteria or dynamic criteria (e.g., more bases may be saved to increase fidelity, or less to save more memory).

If only first 6 bases and corresponding SVs are stored, the coded applications may (e.g., at play time) recover matrix W' 406 (e.g., using equation 1). Once all matrices W' are recovered for a certain frame, the neural network (e.g., neural network 300) may be reconstructed and used to recover color data for known geometry. Graph 408 shows that a means square error between W and W' remains small (below 0.2).

Figure 5:
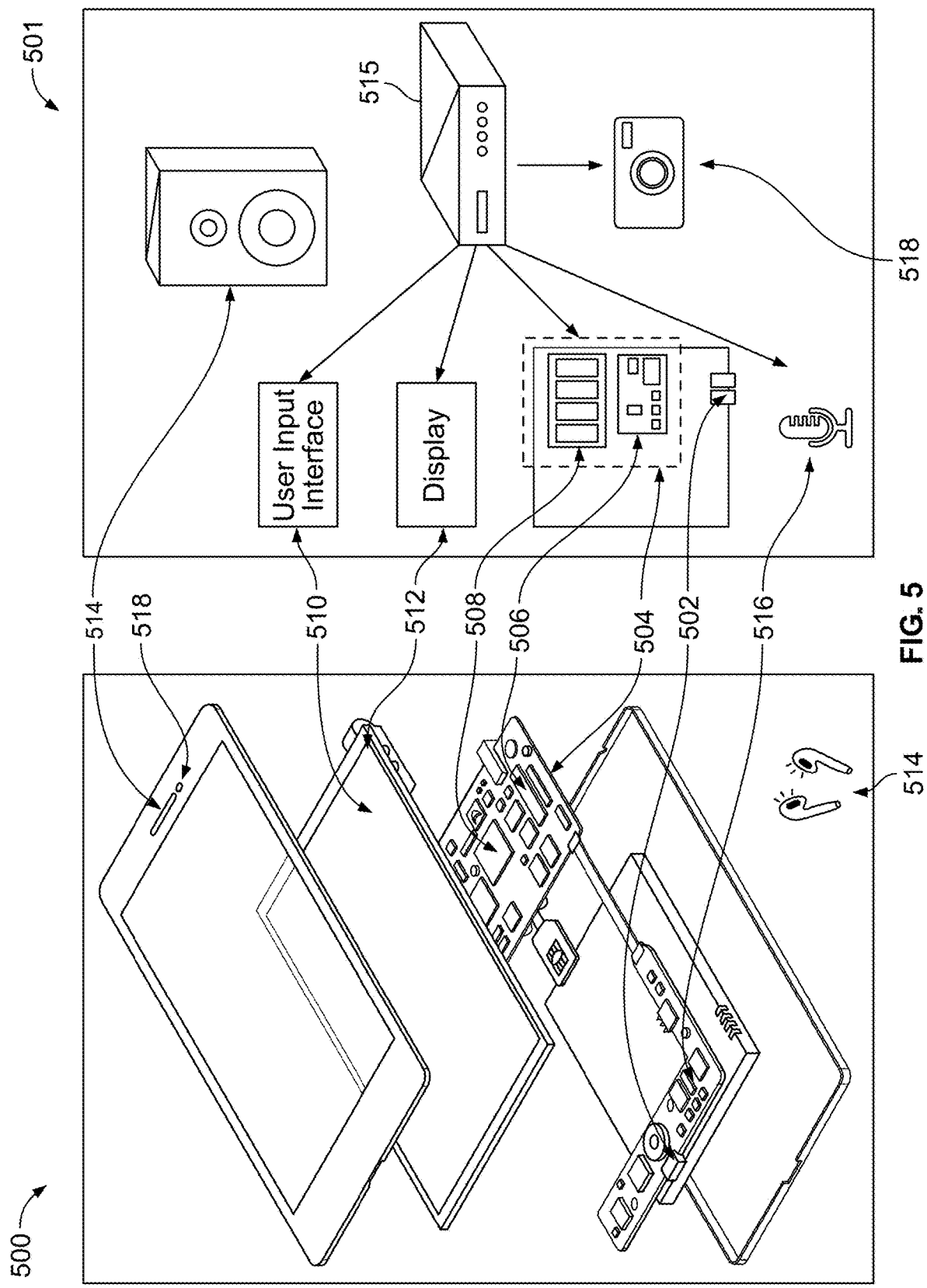
FIG. 5 shows an illustrative user equipment device, in accordance with some embodiments of this disclosure.
Figure 6:
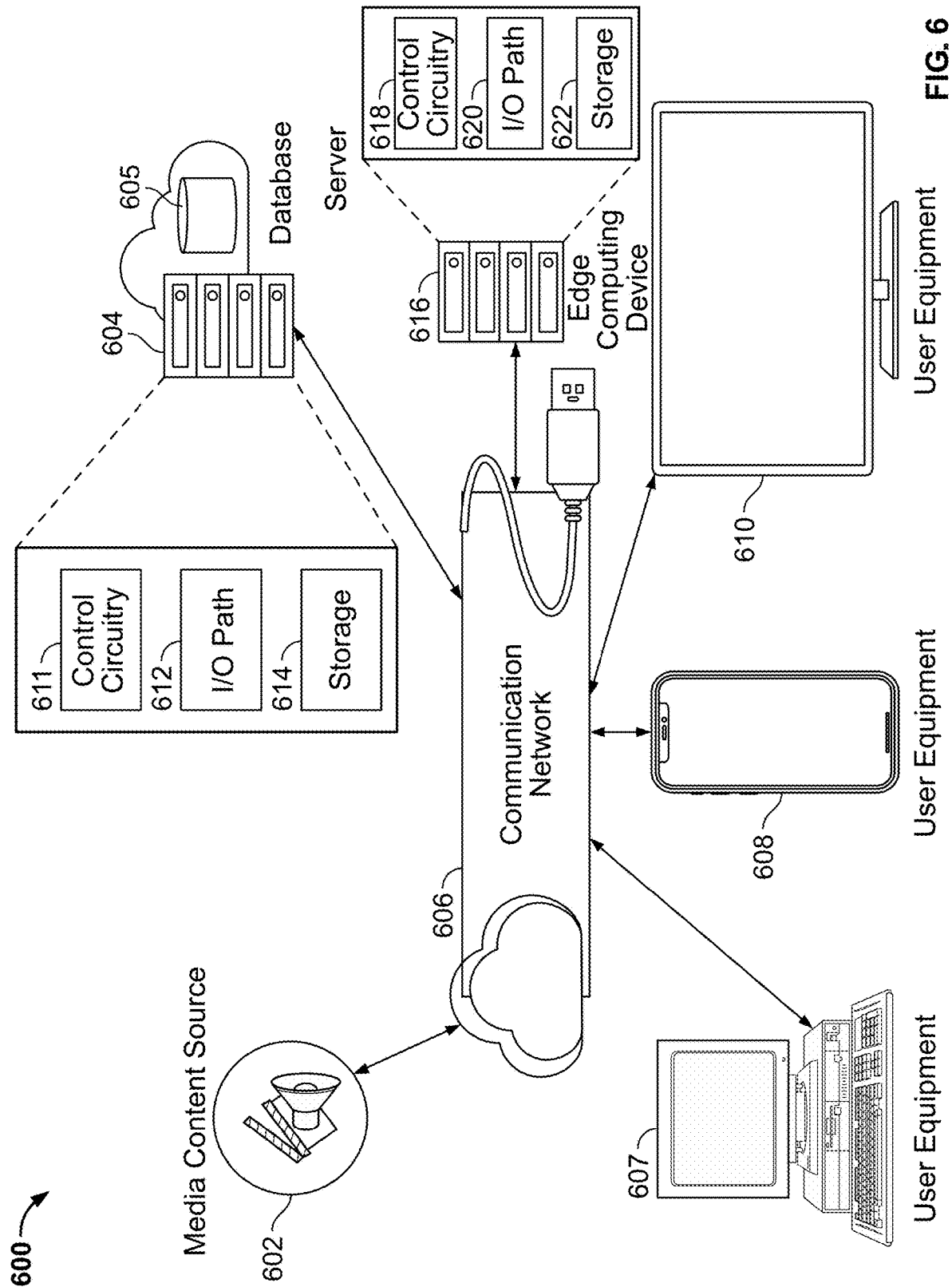
FIG. 6 shows an example system, in accordance with some embodiments of this disclosure.

FIGS. 5-6 depict illustrative devices, systems, servers, and related hardware for image encoding/decoding. FIG. 5 shows generalized embodiments of illustrative user equipment devices 500 and 501, which may correspond to, e.g., computing devices 212, 260, 312, and 314. For example, user equipment device 500 may be a smartphone device, a tablet, a virtual reality or augmented reality device, or any other suitable device capable of processing video data. In another example, user equipment device 501 may be a user television equipment system or device. User television equipment device 501 may include set-top box 515. Set-top box 515 may be communicatively connected to microphone 516, audio output equipment (e.g., speaker or headphones 514), and display 512. In some embodiments, display 512 may be a television display or a computer display. In some embodiments, set-top box 515 may be communicatively connected to user input interface 510. In some embodiments, user input interface 510 may be a remote-control device. Set-top box 515 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each one of user equipment device 500 and user equipment device 501 may receive content and data via input/ output (I/O) path (e.g., circuitry) 502. I/O path 502 may provide content (e.g., broadcast programming, on-demand programming, Internet content, content available over a local area network (LAN) or wide area network (WAN), and/or other content) and data to control circuitry 504, which may comprise processing circuitry 506 and storage 508. Control circuitry 504 may be used to send and receive commands, requests, and other suitable data using I/O path 502, which may comprise I/O circuitry. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing. While set-top box 515 is shown in FIG. 6 for illustration, any suitable computing device having processing circuitry, control circuitry, and storage may be used in accordance with the present disclosure. For example, set-top box 515 may be replaced by, or complemented by, a personal computer (e.g., a notebook, a laptop, a desktop), a smartphone (e.g., device 600), a tablet, a network-based server hosting a user-accessible client device, a non-user-owned device, any other suitable device, or any combination thereof.

Control circuitry 504 may be based on any suitable control circuitry such as processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for the codec application stored in memory (e.g., storage 508). Specifically, control circuitry 504 may be instructed by the codec application to perform the functions discussed above and below. In some implementations, processing or actions performed by control circuitry 504 may be based on instructions received from the codec application.

In client/server-based embodiments, control circuitry 504 may include communications circuitry suitable for communicating with a server or other networks or servers. The codec application may be a stand-alone application implemented on a device or a server. The codec application may be implemented as software or a set of executable instructions. The instructions for performing any of the embodiments discussed herein of the codec application may be encoded on non-transitory computer-readable media (e.g., a hard drive, random-access memory on a DRAM integrated circuit, read-only memory on a BLU-RAY disk, etc.). For example, in FIG. 5, the instructions may be stored in storage 508, and executed by control circuitry 504 of a device 500.

In some embodiments, the codec application may be a client/server application where only the client application resides on device 500 (e.g., device 104), and a server application resides on an external server (e.g., server 604 and/or server 616). For example, the codec application may be implemented partially as a client application on control circuitry 504 of device 500 and partially on server 604 as a server application running on control circuitry 611. Server 604 may be a part of a local area network with one or more of devices 500 or may be part of a cloud computing environment accessed via the internet. In a cloud computing environment, various types of computing services for performing searches on the internet or informational databases, providing encoding/decoding capabilities, providing storage (e.g., for a database) or parsing data (e.g., using machine learning algorithms described above and below) are provided by a collection of network-accessible computing and storage resources (e.g., server 604 and/or edge computing device 616), referred to as "the cloud." Device 600 may be a cloud client that relies on the cloud computing capabilities from server 604 to determine whether processing (e.g., at least a portion of virtual background processing and/or at least a portion of other processing tasks) should be offloaded from the mobile device, and facilitate such offloading. When executed by control circuitry of server 604 or 616, the codec application may instruct control 611 or 618 circuitry to perform processing tasks for the client device and facilitate the encoding/decoding.

Control circuitry 504 may include communications circuitry suitable for communicating with a server, edge computing systems and devices, a table or database server, or other networks or servers. The instructions for carrying out the above-mentioned functionality may be stored on a server (which is described in more detail in connection with FIG. 6). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as codec application data described above. Nonvolatile memory may also be used (e.g., to launch a boot-up routine and other instructions). Cloud-based storage, described in relation to FIG. 5, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of user equipment 500. Control circuitry 504 may also include digital-to-analog converter circuitry and analog-to-digital converter circuitry for converting between digital and analog signals. The tuning and encoding circuitry may be used by user equipment device 500, 501 to receive and to display, to play, or to record content. The tuning and encoding circuitry may also be used to receive video encoding/decoding data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment device 500, the tuning and encoding circuitry (including multiple tuners) may be associated with storage 508.

Control circuitry 504 may receive instruction from a user by way of user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of each one of user equipment device 500 and user equipment device 501. For example, display 512 may be a touchscreen or touch-sensitive display. In such circumstances, user input interface 510 may be integrated with or combined with display 512. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information to set-top box 515.

Audio output equipment 514 may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Audio output equipment 514 may be provided as integrated with other elements of each one of device 500 and equipment 501 or may be stand-alone units. An audio component of videos and other content displayed on display 512 may be played through speakers (or headphones) of audio output equipment 514. In some embodiments, audio may be distributed to a receiver (not shown), which processes and outputs the audio via speakers of audio output equipment 514. In some embodiments, for example, control circuitry 504 is configured to provide audio cues to a user, or other audio feedback to a user, using speakers of audio output equipment 514. There may be a separate microphone 516 or audio output equipment 514 may include a microphone configured to receive audio input such as voice commands or speech. For example, a user may speak letters or words that are received by the microphone and converted to text by control circuitry 504. In a further example, a user may voice commands that are received by a microphone and recognized by control circuitry 504. Camera 518 may be any suitable video camera integrated with the equipment or externally connected. Camera 518 may be a digital camera comprising a charge-coupled device (CCD) and/or a complementary metal-oxide semiconductor (CMOS) image sensor. Camera 518 may be an analog camera that converts to digital images via a video card.

The codec application may be implemented using any suitable architecture. For example, it may be a stand-alone application wholly-implemented on each one of user equipment device 500 and user equipment device 501. In such an approach, instructions of the application may be stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to provide encoding/decoding functionality and preform any of the actions discussed herein. Based on the processed instructions, control circuitry 504 may determine what action to perform when input is received from user input interface 510. For example, movement of a cursor on a display up/down may be indicated by the processed instructions when user input interface 510 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the codec application is a client/server-based application. Data for use by a thick or thin client implemented on each one of user equipment device 500 and user equipment device 501 may be retrieved on-demand by issuing requests to a server remote to each one of user equipment device 500 and user equipment device 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on device 500. This way, the processing of the instructions is performed remotely by the server while the resulting displays (e.g., that may include text, a keyboard, or other visuals) are provided locally on device 500. Device 500 may receive inputs from the user via input interface 510 and transmit those inputs to the remote server for processing and generating the corresponding displays. For example, device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to device 500 for presentation to the user.

In some embodiments, the codec application may be downloaded and interpreted or otherwise run by an interpreter or virtual machine (run by control circuitry 504). In some embodiments, the codec application may be encoded in the ETV Binary Interchange Format (EBIF), received by control circuitry 504 as part of a suitable feed, and interpreted by a user agent running on control circuitry 504. For example, the codec application may be an EBIF application. In some embodiments, the codec application may be defined by a series of JAVA-based files that are received and run by a local virtual machine or other suitable middleware executed by control circuitry 504. In some of such embodiments (e.g., those employing MPEG-2 or other digital media encoding schemes), codec application may be, for example, encoded and transmitted in an MPEG-2 object carousel with the MPEG audio and video packets of a program.

FIG. 6 is a diagram of an illustrative system 600 for encoding/decoding, in accordance with some embodiments of this disclosure. User equipment devices 607, 608, 610 (e.g., which may correspond to one or more of computing device 212 may be coupled to communication network 606). Communication network 606 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 606) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 6 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 606.

System 600 may comprise media content source 602, one or more servers 604, and one or more edge computing devices 616 (e.g., included as part of an edge computing system, such as, for example, managed by mobile operator 206). In some embodiments, the codec application may be executed at one or more of control circuitry 611 of server 604 (and/or control circuitry of user equipment devices 607, 608, 610 and/or control circuitry 618 of edge computing device 616). In some embodiments, data structure 300 of FIG. 3, may be stored at database 605 maintained at or otherwise associated with server 604, and/or at storage 622 and/or at storage of one or more of user equipment devices 607, 608, 610.

In some embodiments, server 604 may include control circuitry 611 and storage 614 (e.g., RAM, ROM, Hard Disk, Removable Disk, etc.). Storage 614 may store one or more databases. Server 604 may also include an input/output path 612. I/O path 612 may provide encoding/decoding data, device information, or other data, over a local area network (LAN) or wide area network (WAN), and/or other content and data to control circuitry 611, which may include processing circuitry, and storage 614. Control circuitry 611 may be used to send and receive commands, requests, and other suitable data using I/O path 612, which may comprise I/O circuitry. I/O path 612 may connect control circuitry 611 (and specifically control circuitry) to one or more communications paths.

Control circuitry 611 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 611 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 611 executes instructions for an emulation system application stored in memory (e.g., the storage 614). Memory may be an electronic storage device provided as storage 614 that is part of control circuitry 611.

Edge computing device 616 may comprise control circuitry 618, I/O path 620 and storage 622, which may be implemented in a similar manner as control circuitry 611, I/O path 612 and storage 624, respectively of server 604. Edge computing device 616 may be configured to be in communication with one or more of user equipment devices 607, 608, 610 and video server 604 over communication network 606, and may be configured to perform processing tasks (e.g., encoding/decoding) in connection with ongoing processing of video data. In some embodiments, a plurality of edge computing devices 616 may be strategically located at various geographic locations, and may be mobile edge computing devices configured to provide processing support for mobile devices at various geographical regions.

Figure 7:
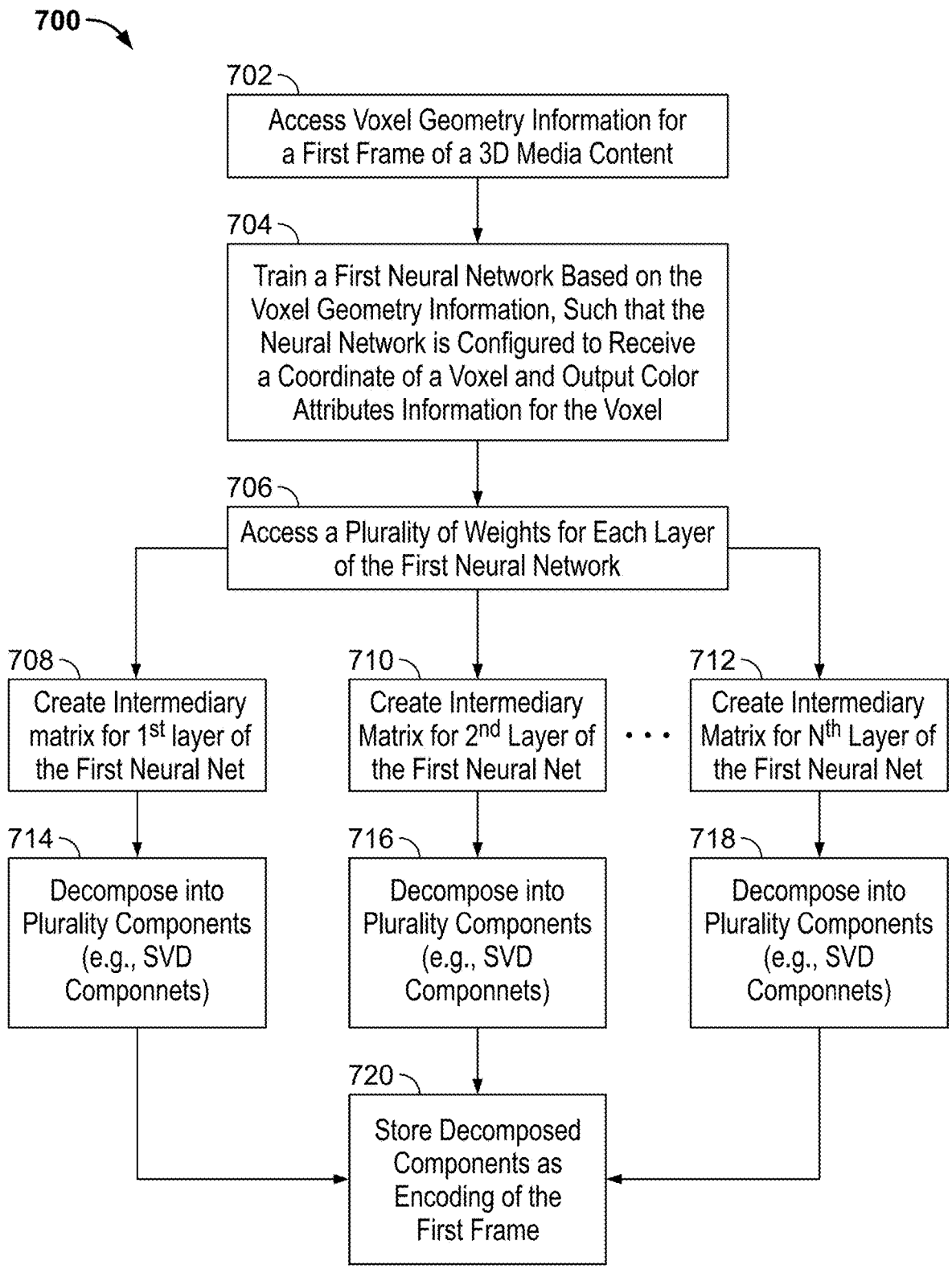
FIG. 7 is a flowchart of a detailed illustrative process for encoding 3D media content data using a neural network, in accordance with some embodiments of this disclosure.

FIG. 7 is a flowchart of a detailed illustrative process 700 for encoding 3D media content data using a neural network, in accordance with some embodiments of this disclosure. In various embodiments, the individual steps of process 700 may be implemented by one or more components of the devices and systems of FIGS. 1-6. Although the present disclosure may describe certain steps of process 700 (and of other processes described herein) as being implemented by certain components of the devices and systems of FIGS. 1-6, this is for purposes of illustration only, and it should be understood that other components of the devices and systems of FIGS. 1-6 may implement those steps instead.

At step 702, control circuitry (e.g., control circuitry 611, control circuitry 618, or control circuitry of any of devices 607, 608, or 610) accesses data voxel geometry information for a first frame of a 3D media content. The first fame may be any frame in the 3D media content. For example, the control circuitry may select a frame at a beginning of a scene or a frame where the geometry information changed significantly (e.g., over 70% change from the last frame). The voxel geometry information may comprise coordinate values for voxels of the frame of the 3D media content and their associated colors. For example, this step may be performed as part of encoding of 3D media content for efficient storage (e.g., in storage 622) or for transmission over a network (e.g., network 606) At step 704, the control circuitry trains a machine learning model (e.g., a neural network stated in storage 622). For example, the training step 706 may be performed during encoding of the 3D media content into a format suitable for storage or transmission. For example, the neural network may be trained to accept as coordinates of a voxel as inputs and to output color attributes information for the voxel. For example, the coordinate input can be provided as [x, y, z] cartesian coordinates, as polar coordinates, or in any other suitable fashion. Color attributes information may be outputted in any suitable fashion, e.g., as RGB values, Cyan Magenta Yellow, key (CMYK) values, hex color values, Hue Saturation lightness (HSL) values, or using any other suitable color encoding scheme.

The machine learning model may comprise a neural network with several fully connected layers, each layer having a matrix of associated weights. The weights may be initially randomized. Training may include computing a result based on the input values and the current weight values, comparison of the computed results to the actual results through a loss function, and adjustment of the weight values through backpropagation of the error computed through the loss function. Forward and backward passes may be repeated (e.g., for same or different inputs) until certain level of performance is achieved (e.g., 95% accuracy). Any other suitable type of training may be used.

At step 706, the control circuitry accesses the matrices of weights for each layer of machine learning model that was trained at step 704 (e.g., stored in memory 622). For example, control circuitry may access it as part of encoding process run by a codec application.

At steps 708-712, the control circuitry may separately process data for each layer of weights of the trained neural network. In some embodiments, steps 708-712 may be performed in any order or simultaneously. In some embodiments, steps 708-712 may be optional and decomposition of weight data in steps 714-718 may be performed directly from weights data without creation of intermediary matrices.

In the shown approach, at step 708, the control circuitry creates an intermediary matrix for a first layer of the neural network trained at step 704 (e.g., by rearranging a row of weights). Similarly, an intermediary matrix may be created for other layers of the neural network at steps 710-712.

At steps 714-718, the control circuitry separately processes data for each intermediary matrix. For example, each matrix (or the set of weights if steps 708-712 were skipped) may be decomposed into a plurality of components that may be used to approximate the weights if re-assembled. In one approach an SVD decomposition (up to a certain number of components) may be used. However, any other suitable decomposition approach may be used that results in memory saving by only storing a subset of components needed to approximate the weights for a respective layer with sufficient fidelity (e.g., 95% accuracy). The decomposition may create a list of Singular values and associated bases as describe above in reference to Formula 1.

At step 720, the control circuitry stores the data that defined the decomposed components for each matrix created at steps 708-712 (or directly decomposed data in steps 714-718). The data may, for example, be stored in storage 622. The stored data may be stored as part of encoding of the 3D media content. The frames encoded using process 700 may be referred to as "fully code" frames.

Figure 8:
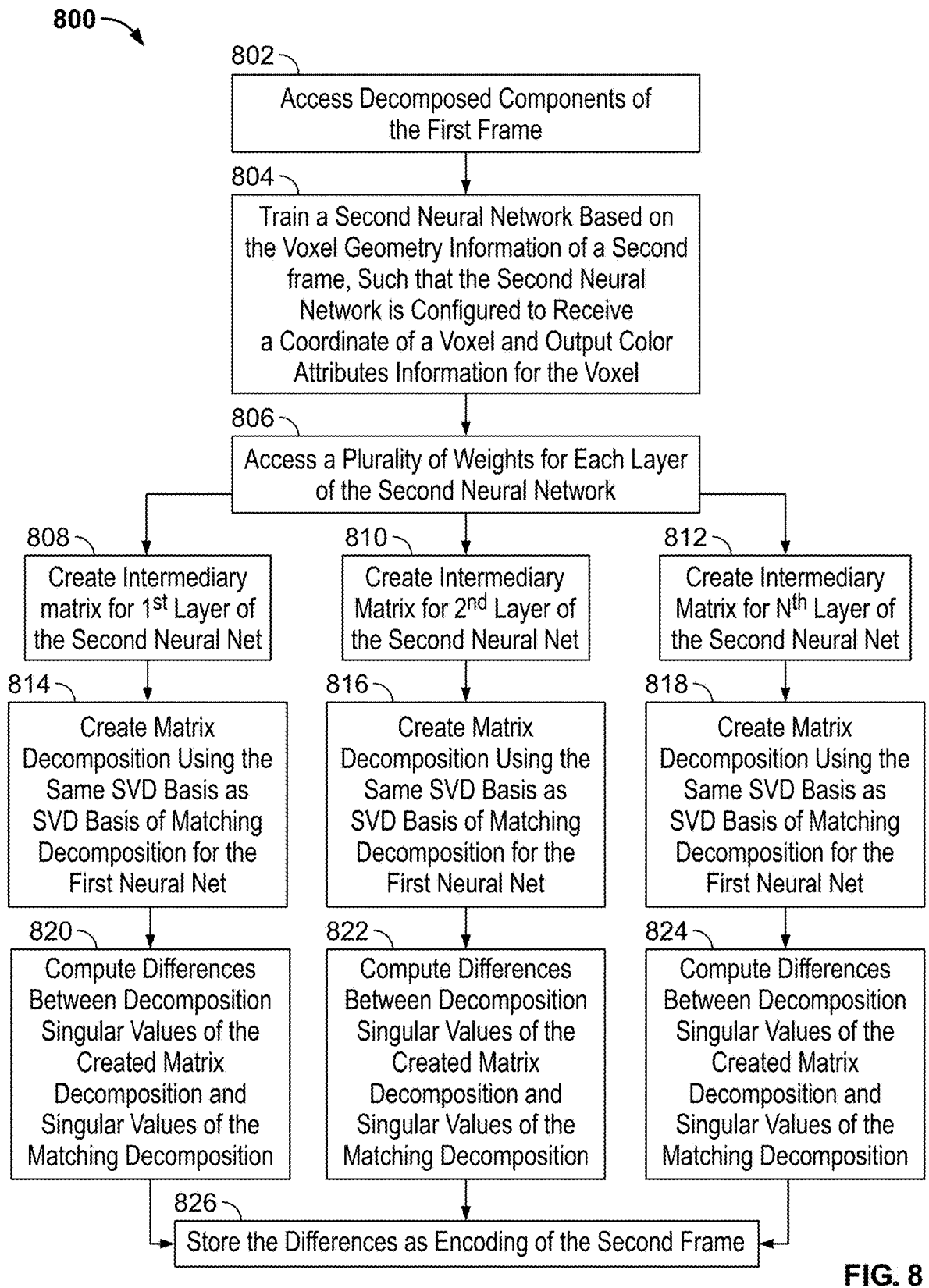
FIG. 8 is another flowchart of a detailed illustrative process for encoding 3D media content data using a neural network, in accordance with some embodiments of this disclosure.

FIG. 8 is another flowchart of a detailed illustrative process for encoding 3D media content data using a neural network, in accordance with some embodiments of this disclosure. In various embodiments, the individual steps of process 800 may be implemented by one or more components of the devices and systems of FIGS. 1-6. Although the present disclosure may describe certain steps of process 800 (and of other processes described herein) as being implemented by certain components of the devices and systems of FIGS. 1-6, this is for purposes of illustration only, and it should be understood that other components of the devices and systems of FIGS. 1-6 may implement those steps instead. In some embodiment, process 800 may be performed to encode another frame (referred to as a second frame) of the 3D media content after an initial frame (referred to as first frame) 3D media content is encoded using steps of process 700. It should be noted that "first" and "second" frame are labels only and may refer to any two frames from a 3D media content.

At step 802, the control circuitry may access data defining decomposed components of a first frame of the 3D media content (e.g., as stored at step 720) to create predictive encoding of a second frame of the 3D media content.

At step 804, the control circuitry trains a second machine learning model (e.g., a neural network stored in storage 622). For example, the training step 804 may be performed during encoding of the 3D media content into a format suitable for storage or transmission. For example, the second neural network may be trained to accept coordinates of a voxel as inputs and to output color attributes information for the voxel (similar to the neural network described above with respect to step 704).

The second machine learning model may comprise a second neural network with several fully connected layers, each layer having a matrix of associated weights. The weights may be initially randomized. In some embodiments, the initial weights may instead be a copy of weights of neural network trained at step 704 for encoding the first frame. This may speed up the training since first and second frames are likely similar. Training may include several forward and backward passes as described in step 704 until desired performance is achieved (e.g., until 95% accuracy is achieved).

At step 806, the control circuitry accesses the matrices of weights for each layer of machine learning model that was trained at step 804 (e.g., stored in memory 622). For example, control circuitry may access it as part of encoding process run by a codec application.

At step 808-812, the control circuitry separately processes data for each layer of weights of the second trained neural network. In some embodiments, steps 808-812 may be performed in any order or simultaneously. In some embodiments, steps 808-712 may be optional and creation of difference data at steps 814-818 may be performed based directly on weights data of first and second neural networks.

In the shown approach, at step 808, the control circuitry creates an intermediary matrix for $1^{st}$ layer of the second neural network trained at step 804 (e.g., by rearranging a row of weights). Similarly, intermediary matrices may be created for other layers of the neural network at steps 810-812.

At steps 814-818 the control circuitry creates matrix decompositions data for each respective matrix created at steps 808-812. In some approaches, the matrix decompositions may utilize the same SVD bases that were created during decomposition of matching matrices from steps 701-712. For example, same SVD bases that were computed at step 714 may be used to encode a matching matrix 814. Similar uses of bases may occur at steps 816-818 (re-using bases from steps 710-712 respectively).

At steps 820-824 the control circuitry computes the differences between layers of weights of second neural network trained in step 804 with respective layers of weights of neural network trained at step 704. In some embodiments, the differences are captured as differences between single values of basis of SVD decompositions performed for each matching pair of matrices. For example, at step 820, the control circuitry may compute a set of difference between SV values computed for certain bases in step 814 with SV values for same bases computed at step 714. Similar computations may occur in each of steps 822-824.

In some embodiments, differences may be stored between decompositions with different bases. For example, the SVD bases for a matching pair of matrices may be similar but not exactly the same. In this case, the computed difference data will store the differences between bases, and between the SV values. In some embodiments, differences may be based on more than one matching frame. For example, some differences may be stored based on matching bases from one frame and some differences may be stored based on matching bases from another frame (e.g., to archive bidirectional prediction).

At step 826 the control circuitry stores (e.g., in memory 622) the differences computed at each step 820-824. The stored data may be stored as part of encoding of the 3D media content. The frames encoded using process 800 may be referred to as "predictive" or "predictively coded" frames.

In some embodiments, the control circuitry may encode some frames of the 3D media content using process 700 as fully coded frames. Such frames may be selected at certain intervals, and/or based on analysis of changes between frames. For example, when frames change sufficiently (e.g., when new color pallet is detected), the control circuitry creates a new fully coded frame. The frames between the fully coded frame may be coded by the control circuitry using process 800 based on one or more of the fully coded frame as a reference frame. The reference frames may not necessarily be selected in order, and may be any of the fully coded frames (e.g., the one that provides most memory savings). For example, when coding a predictively coded frame, process 800 may be repeated several times for several candidate reference frames and only the most compact results (result with smallest set of differences) may then be stored.

In some embodiments, when the processes 700-800 are complete for all frames of the 3D media content, the control circuitry may delete (e.g., from memory 622) the un-encoded voxel color information.

Figure 9:
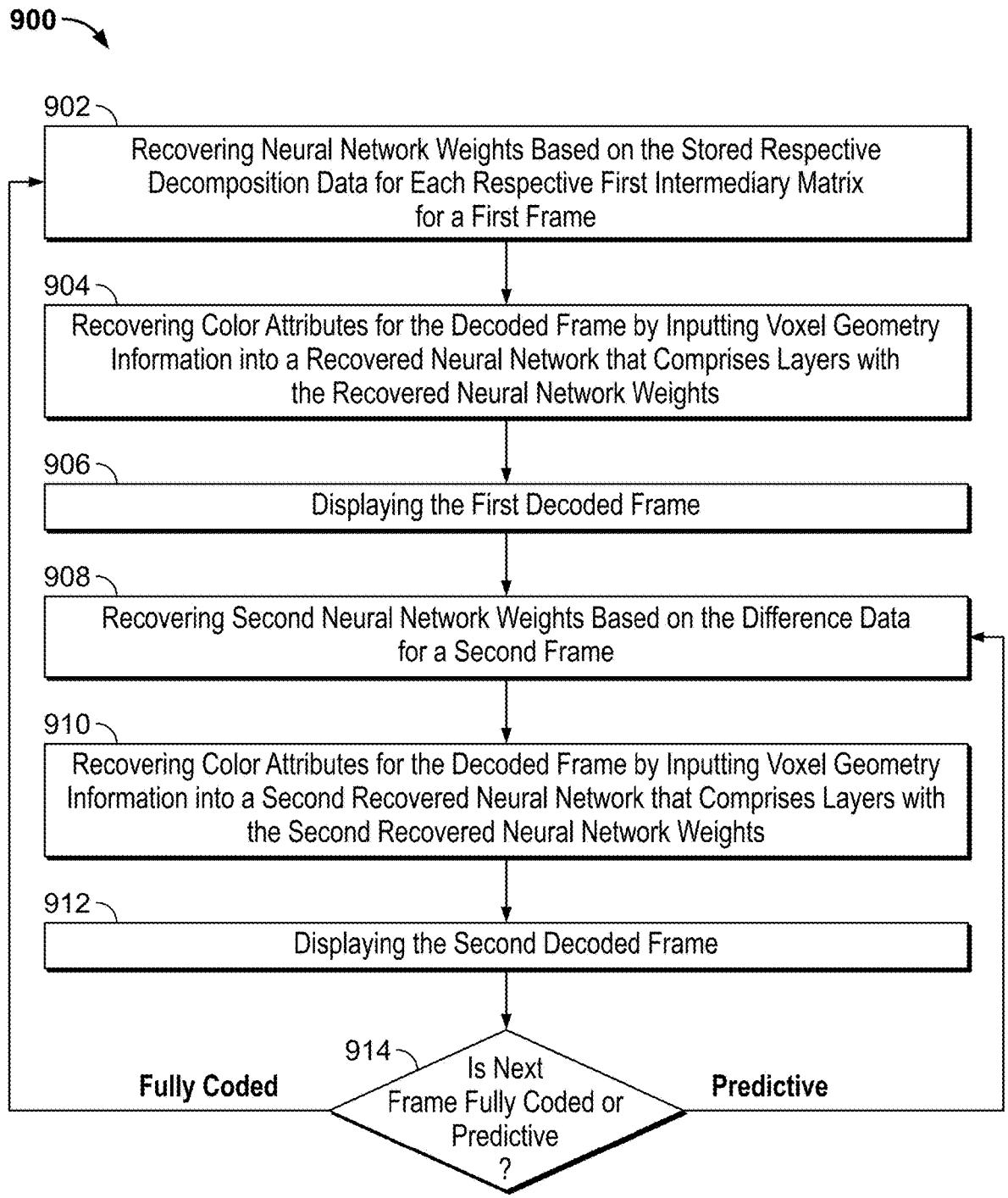
FIG. 9 is a flowchart of a detailed illustrative process for decoding 3D media content data using a neural network, in accordance with some embodiments of this disclosure.

FIG. 9 is a flowchart of a detailed illustrative process for decoding 3D media content data using a neural network, in accordance with some embodiments of this disclosure. In various embodiments, the individual steps of process 900 may be implemented by one or more components of the devices and systems of FIGS. 1-6. Although the present disclosure may describe certain steps of process 900 (and of other processes described herein) as being implemented by certain components of the devices and systems of FIGS. 1-6, this is for purposes of illustration only, and it should be understood that other components of the devices and systems of FIGS. 1-6 may implement those steps instead. In some embodiment, process 900 may be performed to decoded 3D media content (e.g. encoded using processes 700 and 800).

At step 902, the control circuitry, recovers neural network weights based on the stored respective decomposition data for each respective first intermediary matrix for a first frame (e. G., data stored at step 720). The recovery may be performed using formula 1 to recover each layer, resulting in assembly of layers into a neural network using recovered weights.

At step 904, the control circuitry recovers color attributes for the decoded frame by inputting voxel geometry information into a recovered neural network that comprises layers with the recovered neural network weights. At step 904, the control circuitry may display (e.g., at display 512) the first frame based on known geometry and recovered color information.

At step 908, the control circuitry recovers second neural network weights based on the difference data for a second frame (e.g., the difference stored in step 826). For example, the difference may be used to compute SV values, which may be combined with basis computed for the first frame (e.g., fame recovered in 904). The SVD components may be combined for each matrix to recover weights for layers of a second neural network. At step 910 the control circuitry recovers color attributes for the decoded frame by inputting voxel geometry information into a second recovered neural network that comprises layers with the second recovered neural network weights. At step 912, the control circuitry displays (e.g., at display 512) the second frame based on known geometry and recovered color information.

At step 914, the control circuitry accesses encoding for the next frame. If the next frame is predictive, the process continues at 908 to decode a predictive frame. If the next frame is fully coded, process 900 repeats from step 902. Process 900 may continue until playing of 3D media content is complete or paused.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

accessing voxel geometry information for a first frame of a 3D media content;

training a first neural network based on the voxel geometry information of the first frame, such that the first neural network is configured to receive a coordinate of a voxel and output color attributes information for the voxel, wherein the trained first neural network comprises a plurality of weights for each layer of the first neural network;

converting the first plurality of weights of each respective layer of the first neural network into a respective first intermediary matrix of the first frame;

for each respective first intermediary matrix: decomposing the respective first intermediary matrix to create a respective first decomposition data that compromises a plurality of components that approximate the respective first intermediary matrix when combined; and generating encoding data for the first frame by storing each respective decomposition data for each respective first intermediary matrix;

training a second neural network based on voxel geometry information for a second frame of the 3D media content, wherein the trained second neural network comprises a second plurality of weights for each layer of the second neural network;

converting the second weights of each respective layer of the second neural network into a second respective intermediary matrix;

for each respective second intermediary matrix:
identifying a respective matching first intermediary matrix;
generating a respective second decomposition data with same decomposing as the respective matching first intermediary matrix;

computing respective differences based on the respective second decomposition data and decomposition data of the respective matching first intermediary matrix; and generating encoding data of the second frame, at least in part, by storing each of the respective differences computed for each of the respective second intermediary matrix.

2. The method of claim 1, wherein the first neural network comprises a multi-layer fully connected network.

3. The method of claim 2, wherein the converting the first plurality of weights of each respective layer of the first neural network into the respective first intermediary matrix comprises:

representing the first plurality of weights of the multi-layer fully connected network as a table, where each column of the table represents the first plurality of weights for each respective layer of the first neural network; and converting each column of the table into a 2-dimensional matrix comprising more than one row and more than one column.

4. The method of claim 1, wherein the decomposing the respective first intermediary matrix comprises:

performing Singular Value Decomposition (SVD) decomposition of the respective first intermediary matrix to obtain a predetermined number of SVD components.

5. The method of claim 4, wherein the SVD decomposition is performed to obtain a particular number of SVD components with largest singular values, wherein the number of SVD components is selected to be proportional to the size of the first plurality of weights for each layer of the first neural network.

6. The method of claim 4, wherein each respective SVD component is represented by a respective singular value, a respective vector with a size equal to a number of rows of the respective first intermediary matrix, and a second respective vector with a size equal to a number of columns of the respective first intermediary matrix.

7. The method of claim 1, further comprising:

generating a decoded frame by: recovering the first neural network first plurality of weights based on the respective first decomposition data for each respective first intermediary matrix; and recovering color attributes for the decoded frame by inputting voxel geometry information of the first frame into a recovered first neural network that comprises layers with the recovered first neural network first plurality of weights; and generating for display the decoded frame.

8. The method of claim 1, wherein the training the second neural network comprises starting the training with the first plurality of weights of the first neural network.

9. The method of claim 1, wherein the second frame either preceded or follows the first frame in the 3D media content.

10. A system comprising:

control circuitry configured to:

access voxel geometry information for a first frame of a 3D media content;

train a first neural network based on the voxel geometry information of the first frame, such that the first neural network is configured to receive a coordinate of a voxel and output color attributes information for the voxel, wherein the trained first neural network comprises a first plurality of weights for each layer of the first neural network;

convert the first plurality of weights of each respective layer of the first neural network into a respective first intermediary matrix of the first frame;

for each respective first intermediary matrix:

decompose the respective first intermediary matrix to create a respective first decomposition data that compromises a plurality of components that approximate the respective first intermediary matrix when combined; and generate encoding data for the first frame by storing in a memory circuitry each respective decomposition data for each respective first intermediary matrix; and memory circuitry configured to store the encoding data;

train a second neural network based on voxel geometry information for a second frame of the 3D media content, wherein the trained second neural network comprises a second plurality of weights for each layer of the second neural network;

convert the second plurality of weights of each respective layer of the second neural network into a second respective intermediary matrix;

for each respective second intermediary matrix:

identify a respective matching first intermediary matrix;

generate a respective second decomposition data with same decomposing as the respective matching first intermediary matrix of the first frame;

compute respective differences based on the respective second decomposition data and decomposition data of the respective matching first intermediary matrix; and generate encoding data of the second frame, at least in part, by storing each of the respective differences computed for each of the respective second intermediary matrix.

11. The system of claim 10, wherein the first neural network comprises a multi-layer fully connected network.

12. The system of claim 11, wherein the control circuitry is configured to convert the first plurality of weights of each respective layer of the first neural network into the respective first intermediary matrix by:

representing the first plurality of weights of the multi-layer fully connected network as a table, where each column of the table represents the first plurality of weights for each respective layer of the first neural network; and converting each column of the table into a 2-dimensional matrix comprising more than one row and more than one column.

13. The system of claim 10, wherein the control circuitry is configured to decompose the respective first intermediary matrix by:

performing Singular Value Decomposition (SVD) decomposition of the respective first intermediary matrix to obtain a predetermined number of SVD components.

14. The system of claim 13, wherein the control circuitry is configured to perform SVD decomposition to obtain a particular a number of SVD components with largest singular values, wherein the number of SVD components is selected to be proportional to the seize of the first plurality of weights for each layer of the first neural network.

15. The system of claim 13, wherein each respective SVD component is represented by a respective singular value, a respective first vector with a size equal to number of rows of the respective first intermediary matrix, and a second respective vector with a size equal to number of columns of the respective first intermediary matrix.

16. The system of claim 10, wherein the control circuitry is further configured to:
   generate a decoded frame by:
      recovering the first neural network first plurality of weights based on the respective first decomposition data for each respective first intermediary matrix; and
      recovering color attributes for the decoded frame by inputting voxel geometry information of the first frame into a recovered first neural network that comprises layers with the recovered first neural network first plurality of weights; and
   generate for display the decoded frame.

17. The method of claim 1 wherein the first neural network is configured to receive the coordinate of the voxel a three values defining 3D location of the voxel, and output the color attributes information for the voxel as three RGB values.

* * * * *

UNITED STATES PATENT AND TRADEMARK OFFICE
CERTIFICATE OF CORRECTION

| | | |
|---|---|---|
| PATENT NO. | : 12,125,143 B2 | Page 1 of 1 |
| APPLICATION NO. | : 17/829734 | |
| DATED | : October 22, 2024 | |
| INVENTOR(S) | : Zhu Li | |

It is certified that error appears in the above-identified patent and that said Letters Patent is hereby corrected as shown below:

In the Claims

Claim 6, Column 19, Lines 36-37, after "value, a respective" insert --first--

Signed and Sealed this
Tenth Day of December, 2024

Katherine Kelly Vidal
*Director of the United States Patent and Trademark Office*